(12) United States Patent
Wang

(10) Patent No.: US 8,007,101 B1
(45) Date of Patent: Aug. 30, 2011

(54) EYEGLASSES EQUIPPED WITH LIGHTING DEVICES

(75) Inventor: Ching-Hsiang Wang, Tainan City (TW)

(73) Assignee: Day Sun Industrial Corp., Tainan (TW)

( * ) Notice: Subject to any disclaimer, the term of this patent is extended or adjusted under 35 U.S.C. 154(b) by 0 days.

(21) Appl. No.: 12/868,837

(22) Filed: Aug. 26, 2010

(51) Int. Cl.
G02C 1/00 (2006.01)
F21V 21/08 (2006.01)

(52) U.S. Cl. .................................. 351/158; 362/105

(58) Field of Classification Search .............. 351/158, 351/41; 362/105
See application file for complete search history.

(56) References Cited

U.S. PATENT DOCUMENTS

| | | | | |
|---|---|---|---|---|
| 4,959,760 A | * | 9/1990 | Wu | 362/105 |
| 5,722,762 A | * | 3/1998 | Soll | 362/105 |
| 7,422,324 B2 | * | 9/2008 | Lee | 351/158 |
| 7,438,409 B2 | * | 10/2008 | Jordan | 351/158 |
| 7,607,775 B2 | * | 10/2009 | Hermanson et al. | 351/158 |

* cited by examiner

*Primary Examiner* — Hung Dang
(74) *Attorney, Agent, or Firm* — Alan Kamrath; Kamrath & Associates PA

(57) ABSTRACT

Eyeglasses with lighting devices have a front end of each temple including a mount on the inner side and an attachment on the outer side. Each mount is fitted with a battery cover having a first electrode plate. Each attachment has battery compartments for receiving batteries. A second electrode plate is provided in the battery compartments of each attachment and in contact with each battery contained therein. Each attachment has one end formed with a second receiving cavity for receiving a switch and a front end having a curved third receiving cavity for receiving a light-emitting body whose received end is spherical. Each attachment is coupled to the corresponding mount such that a curved concave portion at the front end of each mount and the third receiving cavity of the corresponding attachment jointly form a spherical socket that allows the corresponding light-emitting body to rotate and provide multidirectional lighting.

1 Claim, 4 Drawing Sheets

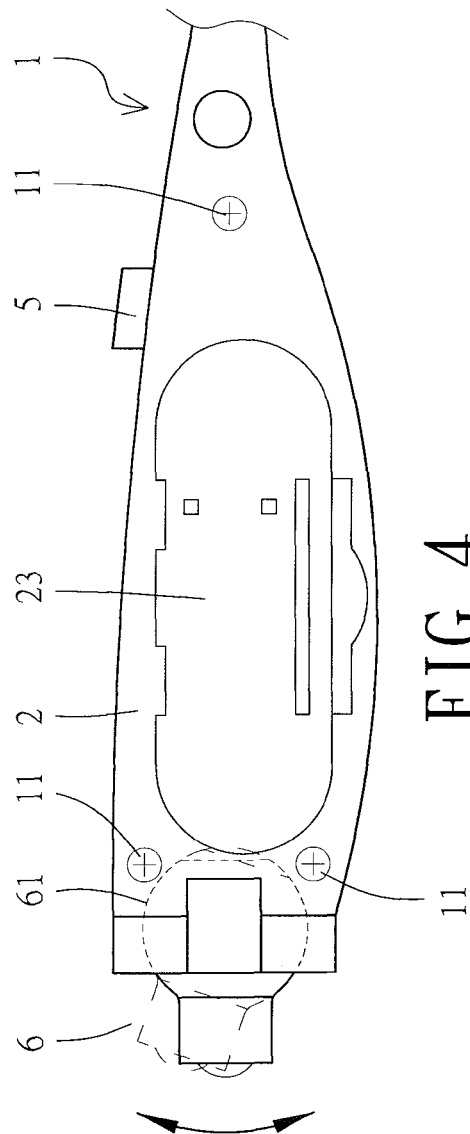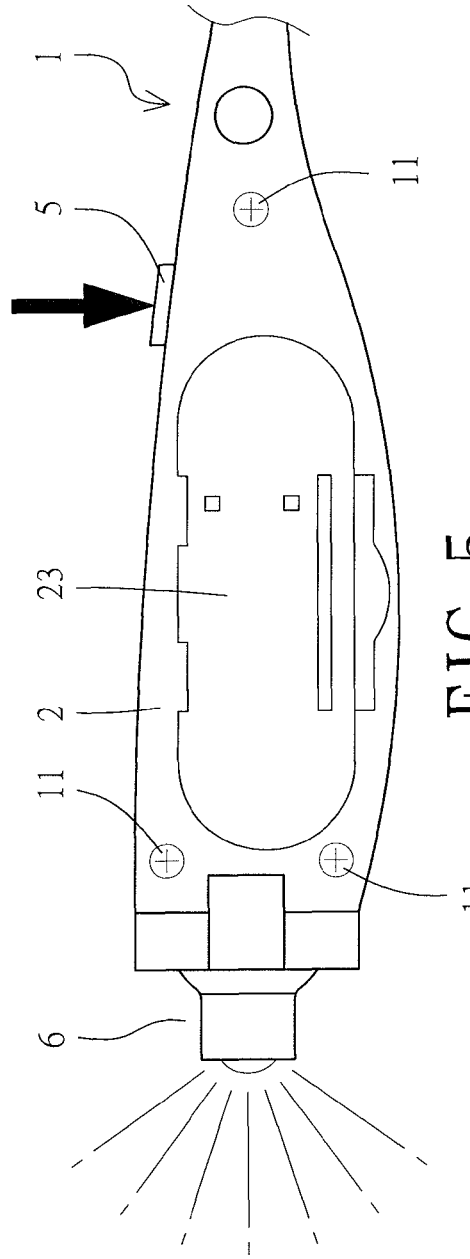

EYEGLASSES EQUIPPED WITH LIGHTING DEVICES

BACKGROUND OF THE INVENTION

1. Technical Field

The present invention relates to eyeglasses and, more particularly, to eyeglasses equipped with lighting devices. The front end of each temple of the eyeglasses is provided with a light-emitting body which is rotatable to provide multidirectional lighting, which is powered by batteries mounted on the corresponding temple, and which is easily turned on or off via a pushbutton located on one lateral side of the corresponding temple.

2. Description of Related Art

Nowadays, there are a great variety of eyeglass assemblies for consumers to choose from based on practical needs. For example, some eyeglasses have temples connected by a strap for adjusting the fit of the eyeglasses elastically, thus allowing the eyeglasses to be worn during sports activities without falling off. Some eyeglasses have a pair of auxiliary eyeglasses pivotally provided at the front side of the lens-bearing frame so as to shade the sun or provide vision correction. The present invention is directed to eyeglasses equipped with auxiliary lighting devices for providing additional lighting when needed.

BRIEF SUMMARY OF THE INVENTION

The present invention provides a substantially useful auxiliary lighting device that is applicable to the temples of eyeglasses of all kinds and is configured to provide lighting whenever needed so as to enhance the functionality of eyeglasses.

The primary object of the present invention is to provide eyeglasses equipped with lighting devices. Each of the bilaterally disposed temples of the eyeglasses has a front end divided into an inner side portion and an outer side portion, with the inner side portion being a mount and the outer side portion being an attachment for accommodating batteries and a switch. Each mount has an opening outwardly extended with a recessed portion. A battery cover having a working side provided with a first electrode plate is fitted in the recessed portion of each mount. Each attachment defines therein a plurality of battery compartments for receiving batteries. A second electrode plate is provided in the battery compartments of each attachment at a position in contact with each battery received therein. Each attachment has one end formed with a second receiving cavity for receiving and stably supporting the corresponding switch. Each attachment has a front end formed with a curved third receiving cavity for receiving a light-emitting body whose received end is spherical. Each attachment is coupled to the mount of the corresponding temple to form a single piece. As a result, a curved concave portion at the front end of each mount and the third receiving cavity of the corresponding attachment jointly form a spherical socket that allows the corresponding light-emitting body to rotate and thereby provide multidirectional lighting.

BRIEF DESCRIPTION OF THE SEVERAL VIEWS OF THE DRAWINGS

The invention as well as a preferred mode of use, further objects, and advantages thereof will be best understood by referring to the following detailed description of an illustrative embodiment in conjunction with the accompanying drawings, in which:

FIG. 4 is a side view of the temple depicted in FIG. 1, showing up/down rotation of the light-emitting body at the front end of the temple;

FIG. 5 is another side view of the temple depicted in FIG. 1, showing a switch at one end of the temple being pressed to turn on or off the light-emitting body.

DETAILED DESCRIPTION OF THE INVENTION

Figure 1:
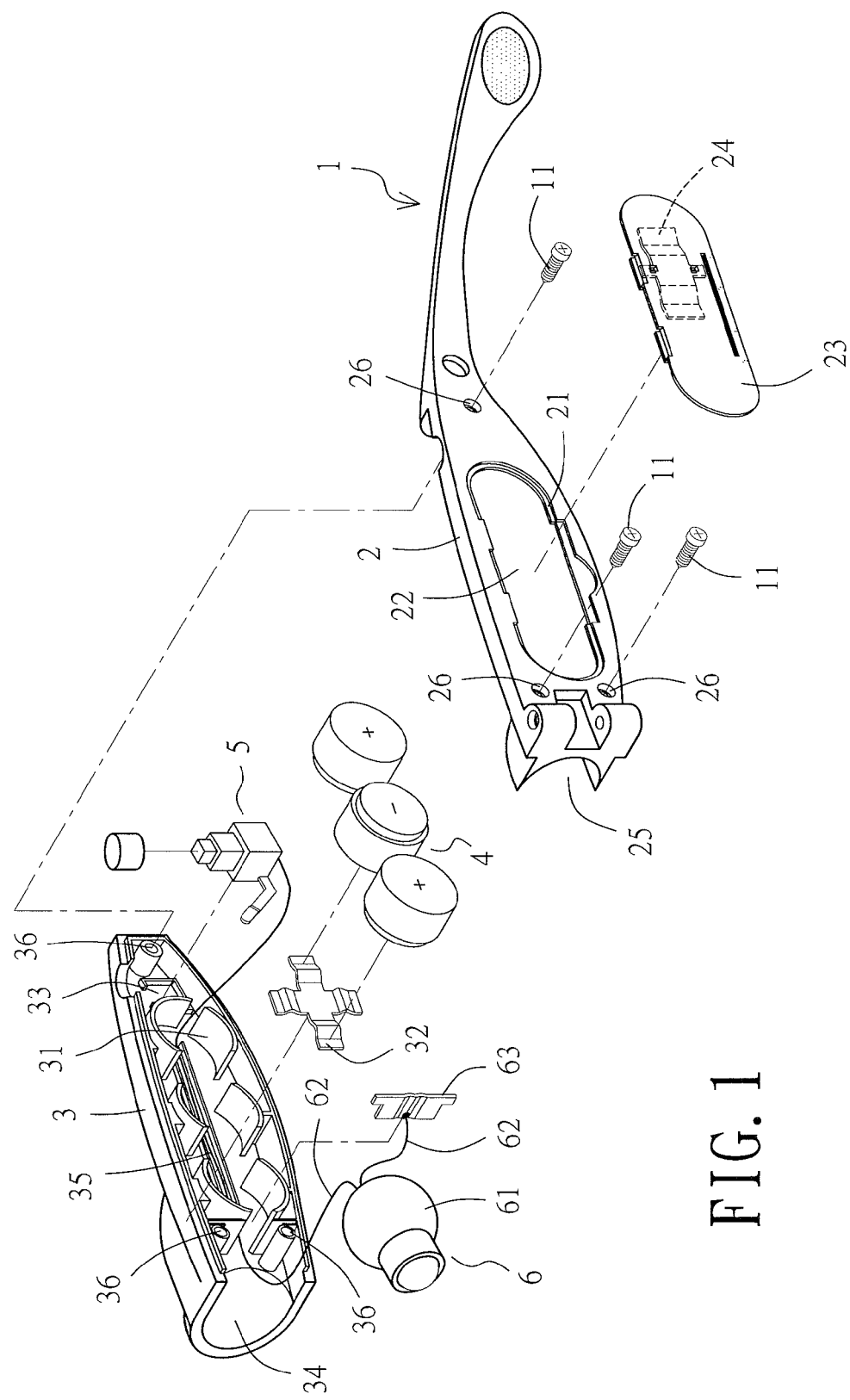
FIG. 1 is an exploded perspective view of a temple equipped with a lighting device according to the present invention.
Figure 6:
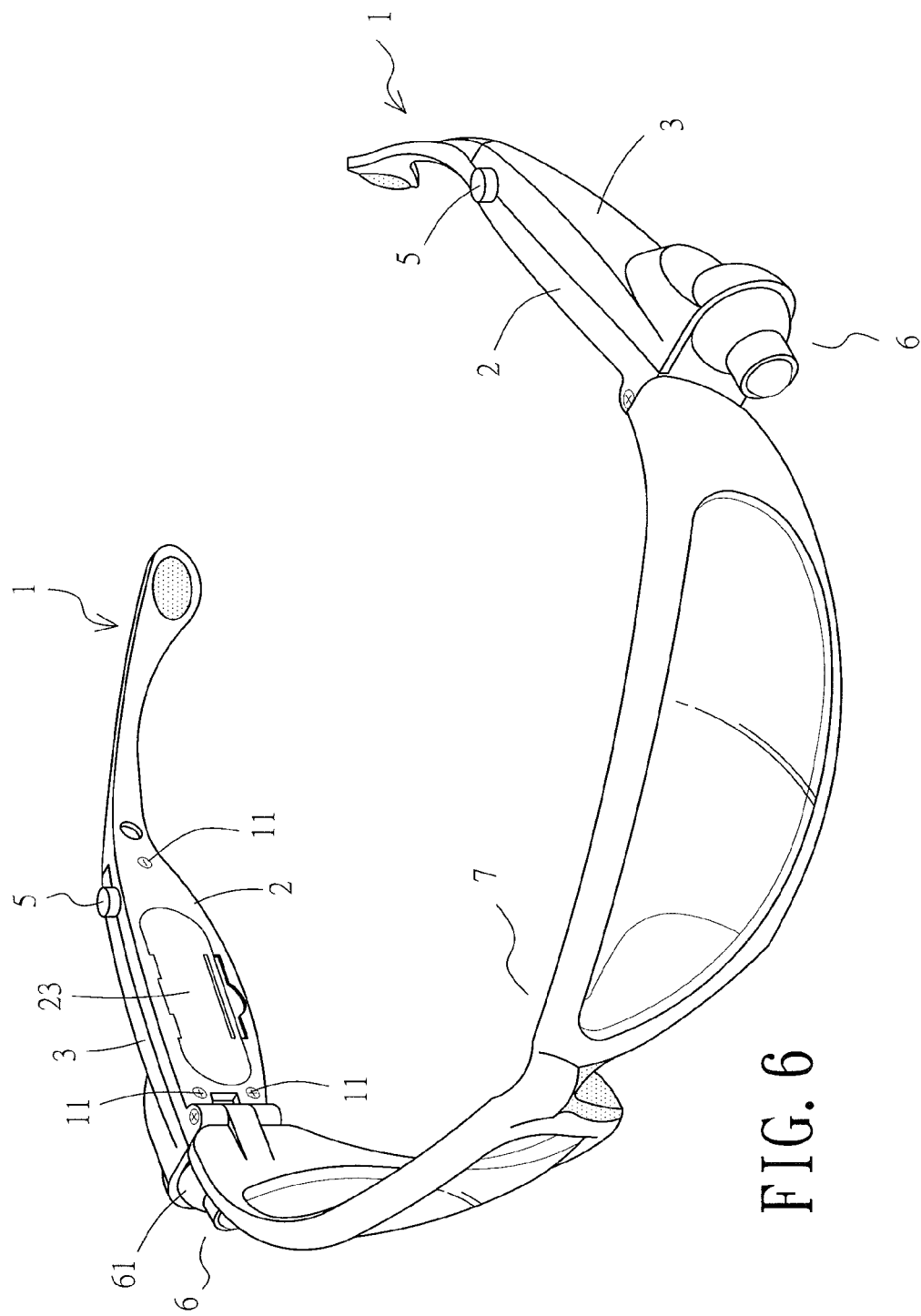
FIG. 6 is a perspective view of an eyeglass assembly equipped with lighting devices according to the present invention.

The present invention provides eyeglasses equipped with lighting devices. Referring to FIGS. 1 and 6, eyeglasses 7 include temples 1 that are respectively and pivotally connected to two ends of the eyeglasses 7. The front end of each temple 1 is provided with a light-emitting body 6 that is rotatable to provide multidirectional lighting.

As shown in FIG. 1, the front end of the temple 1 has an inner side portion formed as a mount 2 and an outer side portion formed as an attachment 3 for accommodating batteries 4 and a switch 5.

Referring to FIG. 1, the mount 2 has an opening 22 outwardly extended with a recessed portion 21. A battery cover 23 is fitted in the recessed portion 21 of the mount 2 and has a working side connected with an electrode plate 24. A curved concave portion 25 is formed at the front end of the mount 2. In addition, holes 26 are formed at an upper position and a lower position of the front end of the mount 2 and at a rear position of the mount 2, respectively.

Referring again to FIG. 1, the attachment 3 is formed with a plurality of battery compartments 31 for receiving the batteries 4. An electrode plate 32 is provided in the battery compartments 31 at a position in contact with each battery 4. A second receiving cavity 33 is formed at one end of the attachment 3 and is configured to receive and support the switch 5 stably. A third receiving cavity 34 having a curved configuration is formed at the front end of the attachment 3 to receive the light-emitting body 6, which has a spherical received end 61 and is connected with anode and cathode wires 62. One of the wires 62 is routed along a groove 35 of the attachment 3 and connected to the switch 5, while the other of the wires 62 is connected to an electrode plate 63 disposed stably in the third receiving cavity 34. Besides, a plurality of holes 36 are formed at the third receiving cavity 34 of the attachment 3 and at the end of the attachment 3 that is adjacent to the second receiving cavity 33, respectively. The holes 36 correspond in position to the holes 26 of the mount 2. Thus, after the attachment 3 and the mount 2 are brought close to each other, threaded fasteners 11 can be screwed into the corresponding holes 26, 36 to fasten the attachment 3 and the mount 2 together.

Figure 2:
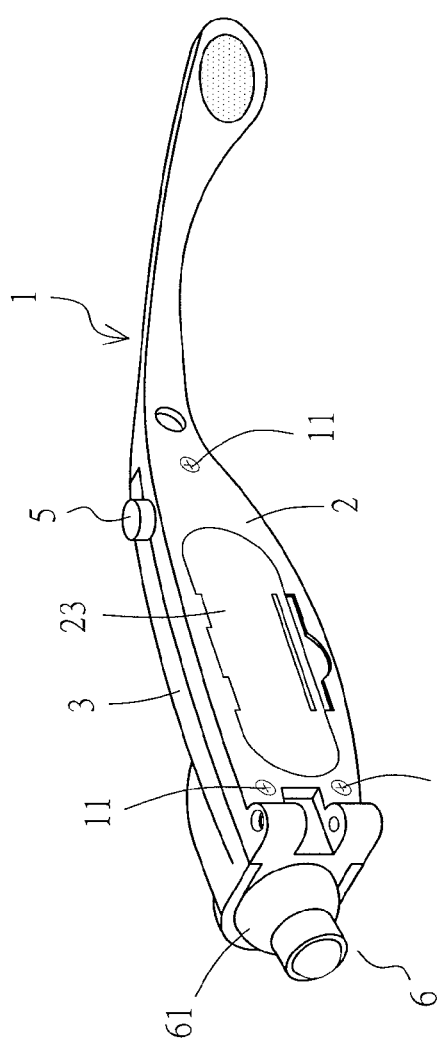
FIG. 2 is an assembled perspective view of the temple depicted in FIG. 1.
Figure 3:
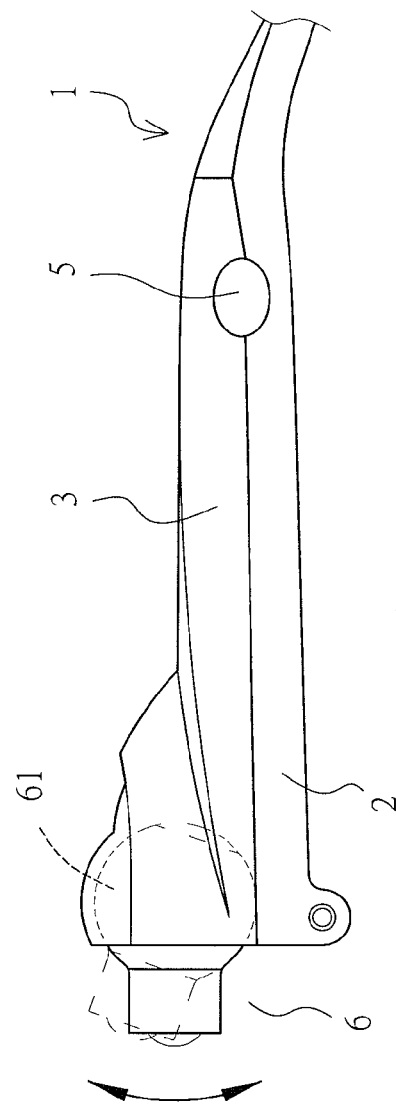
FIG. 3 is a top view of the temple depicted in FIG. 1, showing left/right rotation of a light-emitting body at the front end of the temple.

Referring to FIG. 1 to FIG. 3, the attachment 3 mounted with the batteries 4, the switch 5, and the light-emitting body 6 is assembled to the mount 2 of the temple 1 in the following manner. To begin with, the attachment 3 and the mount 2 are brought close to each other. Then, the threaded fasteners 11 are inserted sequentially through the corresponding holes 26, 36 of the mount 2 of the temple 1 and the attachment 3 to fasten the mount 2 and the attachment 3 together. Consequently, the curved concave portion 25 at the front end of the mount 2 and the third receiving cavity 34 of the attachment 3 jointly form a spherical socket for receiving the light-emitting body 6 and allowing the light-emitting body 6 to rotate and thereby provide multidirectional lighting. For instance, the light-emitting body 6 can be rotated from left to right and vice versa, as shown in FIG. 3, and rotated up and down, as shown in FIG. 4. To turn on or off the light-emitting body 6 installed on the temple 1, the switch 5 is pressed to form or break current conduction, as shown in FIG. 5.

The disclosed eyeglasses, whose temples are equipped with the light-emitting bodies, provide the following advantages in use;

1. The light-emitting bodies installed respectively at the front ends of the bilaterally disposed temples of the eyeglasses can be rotated to the desired directions by pressing the switches, so as to provide convenient lighting.

2. When the batteries mounted on the bilaterally disposed temples of the eyeglasses need replacing, the user only has to pull open the battery covers on the inner sides of the temples to take out the batteries and put in new ones. Thus, the batteries on the temples are easily and rapidly replaced.

3. As the light-emitting bodies installed on the bilaterally disposed temples of the eyeglasses are received in spherical sockets, the light-emitting bodies can be rotated to project light in different directions and thereby increase the applicability of the eyeglasses.

What is claimed is:

1. Eyeglasses equipped with lighting devices, with the eyeglasses comprising temples connected to two ends of an eyeglass frame respectively, wherein each said temple has a front end provided with a light-emitting body, wherein the front end of each said temple has:

an inner side portion formed as a mount, with the mount having an opening outwardly extended with a recessed portion and having a battery cover fitted in the recessed portion of the mount, with the battery cover having a working side connected to a first electrode plate; and an outer side portion formed as an attachment for accommodating batteries and a switch; with the attachment having a plurality of battery compartments for receiving the batteries, with the battery compartments being provided with a second electrode plate at a position in contact with each said battery, with the attachment having an end formed with a second receiving cavity for receiving and stably supporting the switch, with the attachment having a front end formed with a curved third receiving cavity for receiving a corresponding said light-emitting body, wherein each said light-emitting body has a spherical received end, with the attachment being coupled and fixed in position to the mount to form a single piece, wherein a curved concave portion at a front end of the mount and the third receiving cavity of the attachment jointly form a spherical socket which allows the corresponding said light-emitting body to rotate and provide multidirectional lighting.

* * * * *